United States Patent
Yuan

(10) Patent No.: US 10,700,964 B1
(45) Date of Patent: Jun. 30, 2020

(54) CENTRALIZED APPLICATION-LAYER ROUTING AT THE EDGE OF AN ONLINE APPLICATION SERVICE PROVIDER NETWORK

(71) Applicant: Dropbox, Inc., San Francisco, CA (US)

(72) Inventor: Haowei Yuan, San Mateo, CA (US)

(73) Assignee: Dropbox, Inc., San Francisco, CA (US)

( * ) Notice: Subject to any disclaimer, the term of this patent is extended or adjusted under 35 U.S.C. 154(b) by 48 days.

(21) Appl. No.: 16/240,501

(22) Filed: Jan. 4, 2019

(51) Int. Cl.
| | |
|---|---|
| H04L 12/721 | (2013.01) |
| H04L 29/08 | (2006.01) |
| H04L 12/26 | (2006.01) |
| H04L 12/733 | (2013.01) |
| H04L 12/841 | (2013.01) |

(52) U.S. Cl.
CPC .......... *H04L 45/34* (2013.01); *H04L 43/0864* (2013.01); *H04L 45/126* (2013.01); *H04L 45/38* (2013.01); *H04L 47/283* (2013.01); *H04L 67/02* (2013.01)

(58) Field of Classification Search
CPC ......... H04L 45/34; H04L 67/02; H04L 45/38; H04L 43/0864; H04L 47/283; H04L 45/126
USPC .......................................................... 709/238
See application file for complete search history.

(56) References Cited

U.S. PATENT DOCUMENTS

| | | | |
|---|---|---|---|
| 9,054,977 B2 * | 6/2015 | Kumar | .................... H04L 41/12 |
| 2012/0039161 A1 | 2/2012 | Allan et al. | |
| 2015/0188837 A1 | 7/2015 | Djukic et al. | |
| 2015/0288596 A1 * | 10/2015 | Kumar | .................. H04L 49/109 |
| | | | 370/254 |

(Continued)

OTHER PUBLICATIONS

Yap et al., "Taking the Edge off with Espresso: Scale, Reliability and Programmability for Global Internet Peering", SIGCOMM '17, Aug. 21- 25, 2017, 14 pages.

(Continued)

*Primary Examiner* — Michael Won
(74) *Attorney, Agent, or Firm* — Hickman Palermo Becker Bingham LLP; Adam C. Stone

(57) ABSTRACT

Techniques for centralized application-layer routing at the edge of an online application service provider network. In some embodiments, for example, a method comprises: storing a data structure representing a digraph having nodes and directed edges connecting the nodes, the nodes including a source node and a destination node, each of the directed edges corresponding to a path in a network and associated with a cost and a capacity of the path; determining a maximum flow from the source node to the destination node wherein a total cost is minimized; based on the maximum flow, determining a respective weight for each of a plurality of network destinations in the network; receiving a first application layer network message at an edge device in the network; selecting a particular network destination of the plurality of network destinations based on the respective weights determined for the plurality of network destinations;

(Continued)

and in response to the selecting the particular network destination, sending a second application layer network message that is based on the first application layer network message from the edge device to the particular network destination.

20 Claims, 5 Drawing Sheets

(56) References Cited

U.S. PATENT DOCUMENTS

2016/0149816 A1* 5/2016 Wu .................... H04L 45/28
370/235
2019/0158605 A1* 5/2019 Markuze ............... H04L 69/162

OTHER PUBLICATIONS

Schlinker et al., "Engineering Egress with Edge Fabric", Steering Oceans of Content to theWorld, ACM SIGCOMM, Aug. 21-25, 2017, Los Angeles, 14 pages.
Poderys, Justas, "Evaluating Application-Layer Traffic Optimization Cost Metrics for P2P Multimedia Streaming", dated 2017, 5 pages.
NetworkX, "Software for Complex Networks", https://networkx.github.io/, dated 2019, 1 page.
Mukerjee et al., "Redesigning CDN-Broker Interactions for Improved Content Delivery", dated 2017 Association for Computing Machinery, 13, pages.

* cited by examiner

US 10,700,964 B1

CENTRALIZED APPLICATION-LAYER ROUTING AT THE EDGE OF AN ONLINE APPLICATION SERVICE PROVIDER NETWORK

TECHNICAL FIELD

The present invention relates generally to the technical field of software defined networking and, more particularly, to computer-implemented techniques for centralized application-layer routing at the edge of an online application service provider network.

BACKGROUND

Today, many large-scale online application services including content management services, content collaboration services, social networking services, and other types of application services have end-users distributed around the globe. Applications provided by these services may be hosted in a few, relatively centralized data centers. A data center may encompass a physical hosting facility or building in which server computers (e.g., HTTP/S servers) and other networked computing devices are co-located together to provide one or more application services to end-users. For example, a large-scale application service may have tens or even hundreds of millions of end-users across the world, yet applications provided by the application service may be hosted in a few data centers located in North America.

An end-user's satisfaction with an application service generally decreases as response times increase. Accordingly, it is a general goal of an application service provider to process, as quickly as possible, application-layer request messages (e.g., HTTP/S request messages) sent from end-user computing devices. Such processing may include determining and obtaining the information requested by the application-layer request message to be sent back to the requesting end-user computing device in one or more application-layer response messages.

A possible approach towards meeting the goal of minimum response time is to route the application-layer request messages to the data center that is closest in terms of geographic proximity to the end user's computing device. This strategy follows from the general principle that the cost of network communication between two computers generally increases as the physical distance between the two computers increases. For example, if an application service operates two data centers, one in San Jose, Calif., USA and another in Arlington, Va., USA, then most application-layer request messages from end-users in Hong Kong may be routed to the data center in San Jose, Calif. which is geographically closer to those users than Arlington, Va.

Routing of application-layer network request messages from end-user computing devices to data centers may be accomplished based on predefined application-layer routing configuration at geographically distributed points-of-presence provisioned at the edge of the application service provider's network. The points-of-presence may include a number of co-located server computers (e.g., HTTP/S servers) and other networked computing devices that the application service provider may provision in various geographic regions to provide a more local access point to the application service provider's network for end-users in a region relative to the data centers. In addition, a point-of-presence may be used to move some application processing and application data serving performed in the data centers closer to the end-users in the region, thereby improving the responsiveness of the application service for the end-users.

Conventionally, the predefined application-layer routing configuration at points-of-presence for routing application-layer request messages to data centers is statically configured and maintained manually by human network administrators of the application service provider. This static configuration and manual maintenance does not scale well with more points-of-presence, more end-users, and dynamic network conditions. Thus, application service providers would appreciate techniques that address the issues associated with the static configuration and the manual maintenance of application-layer routing configuration at points-of-presence in the application service provider's network.

The present invention addresses this and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

For a better understanding of the various described implementations, reference should be made to the Detailed Description of Implementations below, in conjunction with the following drawings in which like reference numerals refer to corresponding parts throughout the figures.

DETAILED DESCRIPTION OF IMPLEMENTATIONS

Figure 1:
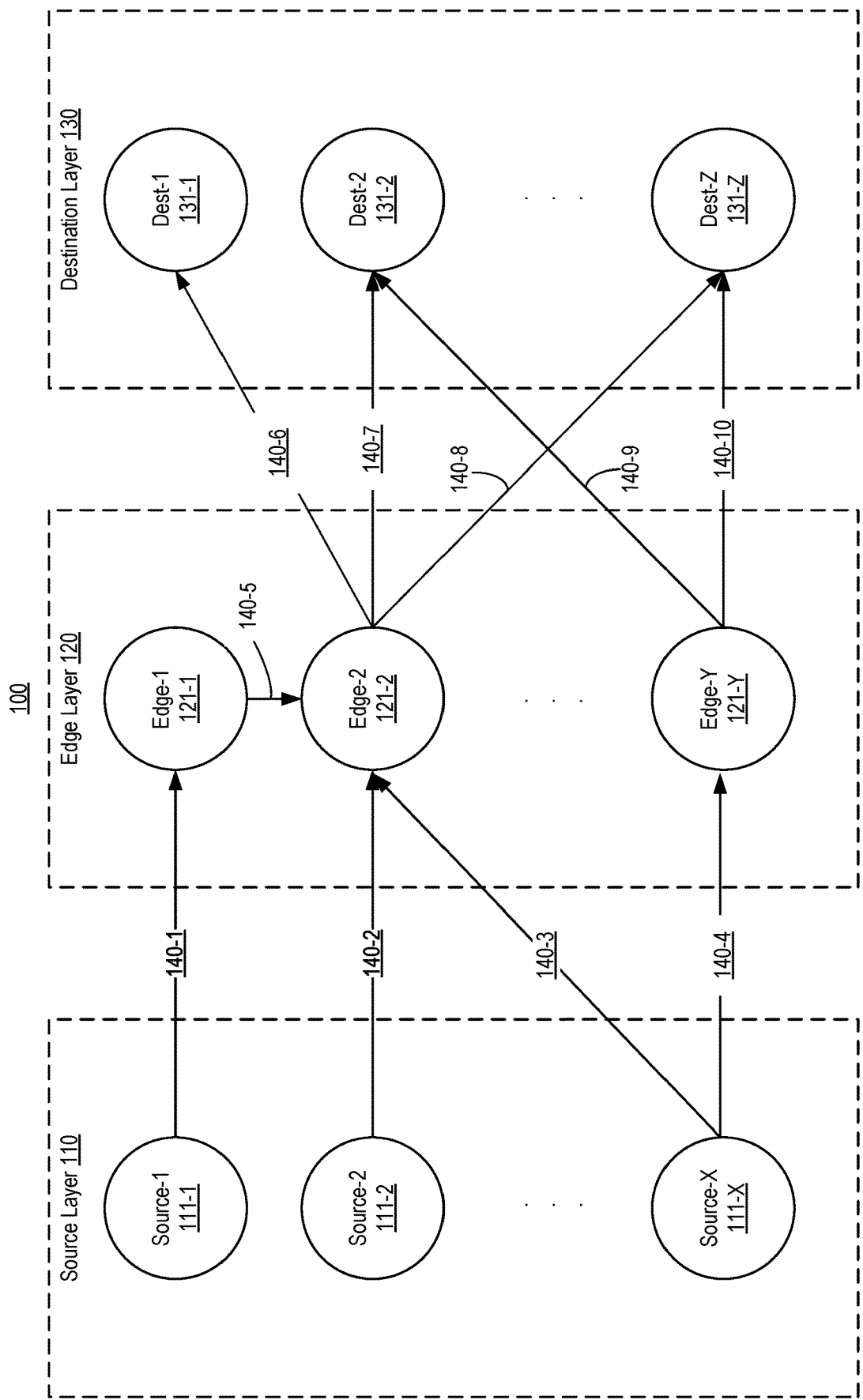
FIG. 1 illustrates an example data communications network, according to some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

General Overview

The deficiencies of existing approaches for configuring application-layer routing at the edge of an online application service provider network and other issues are addressed herein with a more centralized approach.

At a high-level, the centralized approach involves modeling the application service provider's network as a directed graph. Nodes of the graph represent points-of-presence and data centers in the network. Directed edges of the graph from the nodes representing the points-of-presence to the node representing data centers representing application-layer request messages that flow in the network from the points-of-presence to the data centers as a result of receiving application-layer request messages at the points-of-presence that are sent from end-user computing devices.

In addition, the directed graph model incorporates the capacities of the points-of-presence and the data centers and the costs of transmitting application-layer request messages from the points-of-presence to the data centers in the network. The capacities of the points-of-presence is measured by the actual application-layer request message load on the points-of-presence that is incoming for end-user computing devices. The capacities of the data centers is represented by the maximum application-layer request message load incoming from the points-of-presence that the data centers are capable of handling while meeting a minimum quality of service level. The costs of transmitting application-layer request messages from the points-of-presence to the data centers is measured by actual round-trip-times of network messages between the points-of-presence and the data centers. With these capacity and cost constraints, a minimum-cost maximum flow of application-layer request messages is determined based on the directed graph model. From the minimum-cost maximum application-layer request message flow determined, a set of weights is determined for each point-of-presence in the network. The set of weights for each point-of-presence may include a separate weight for each data center that is reachable from the point-of-presence. The separate weight for a data center may reflects the proportion of application-layer request messages received at the point-of-presence that are to be routed to that data center relative to the other data centers that are reachable from the point-of-presence. For example, the point-of-presence can use the set of weights for weighted round-robin routing of application-layer request messages.

With the foregoing approach, application-layer routing configuration for points of presence can be determined automatically based on the cost and capacity constraints. Further, the configuration can be updated periodically (e.g., every minute, every five minutes, every ten minutes, etc.) to adapt to different current network conditions based on current or recently determined cost and/or capacity constraints. With the approach, an application-layer routing configuration can be determined that maximizes application-layer request message flow within the application service provider's network between the points of presence and the data centers whose total cost minimized. Also, the approach can be applied to optimize the routing configuration for certain times of the day/days of the week. For example, the approach can be applied to historical measured costs and capacities for all points of presence and all data centers during a reoccurring weekly period of time such as, for example, 8 pm Sunday to 2 am Monday in San Jose, Calif., USA over a number of weeks when load on that data center from locally sourced network traffic is expected to be light. The resulting set of weights determined can be configured at the points of presence around the world during that reoccurring time period such that more network traffic from points of presence experiencing a relatively heavy load during that time period (e.g., points of presence in Eastern Asia that are in the middle of the Monday work day) can be routed to the data center in San Jose, Calif. as opposed to other data centers. As such, the approach can be applied to optimize the overall utilization of all data centers continually (e.g., every minute, every five minutes, etc.) and/or at different times of the day and/or days of the week.

Centralized Approach for Determining Application-Layer Routing Configuration

More specifically, according to some implementations, the online application service provider network is modeled as a directed graph by storing (e.g., in storage media) a data structure (e.g., an adjacency list, a dictionary, or other suitable data structure) representing the directed graph. The directed graph has nodes and directed edges.

The nodes of the directed graph may include a source node representing the collective sources of application-layer request messages (e.g., HTTP/S request messages) incoming to the application service provider network from end-user computing devices. Those sources may include, for example, the networked personal computing devices (e.g., desktop computers, laptop computers, mobile phones, tablet computers, etc.) of end-users of the online service.

The nodes of the directed graph also include a destination node representing the collective destinations within the online application service provider network of the incoming application-layer network traffic. For example, the destination node may represent the HTTP/S servers housed in various data centers connected in the application service provider's network.

The directed graph also has nodes representing points of presence at the edge of the application service provider network, nodes representing data centers in the application service provider network, and directed edges from the point of presence nodes to the data center nodes where each such directed edge is from a node representing a point of presence to a node representing a data center that is reachable in the application service provider's network from the point of presence. Here, "reachable" may be defined with respect to the application-layer. For example, a data center may be considered reachable from a point-of-presence if an application-layer request message sent from the point-of-presence can be received and processed at the data center. In contrast, the data center may not be considered reachable from a point-of-presence if a network connection (e.g., TCP connection) can be established between the data center and the point-of-presence but an application-layer network message cannot be sent over that network connection from the point-of-presence and received and processed at the data center. The data center may also not be considered reachable if the network connection cannot be established from the point-of-presence to the data center (e.g., because of a network firewall or routing configuration).

In addition, each directed edge between a point of presence node and a data center node in the graph may be associated with a cost. The cost of a directed edge from a point of presence node to a data center node may represent the cost to send application-layer network request messages in the online application service provider's network from the point of presence to the data center. For example, the cost may be determined based on measuring round-trip-times of user datagram protocol (UDP) packets and/or transmission control protocol (TCP) packets in the network from the point of presence to the data center. In addition, or alternatively, the cost may be measured from the perspective of the point-of-presence in terms of round-trip-times between sending application-layer request messages from the point-of-presence to the data center and receiving application-layer response messages thereto at the point-of-presence from the data center. The cost may reflect an average, mean, median or other statistical summarization of multiple round-trip-time measurements. The cost may also be normalized to correct for outliers such as by taking the square root of a round-trip-time or by using a utility function where the round-trip-time is a parameter.

In addition, each directed edge between a point of presence node and a data center node in the graph may be associated with a capacity. The capacity of the directed edge from the point of presence node to the data center node represents the maximum capacity (bandwidth) of the network link that underlies the path in the application service provider's network from the point of presence to the data center. For example, the maximum capacity may be determined as the maximum or a threshold amount of network traffic that can flow along the network link in terms of bits per second (e.g., gigabits per second) as converted to application-layer request messages per second. For example, an actual or estimate number of bits per application-layer request message may be used to convert gigabits per second to application-layer request messages per second. Alternatively, in some implementations, the capacity of the directed edge from the point of presence node to the data center node is considered to be infinite or other value that reflects that the capacity of the application service provider's network between the points-of-presence and the data center is not a constraint on the maximum application-layer request message flow in the network.

In addition, the directed edges in the directed graph from the source node to the point of presence node may also be associated with a cost and a capacity. The cost of these directed edges may all be a same nominal cost value (e.g., zero) across all of these directed edges to reflect that the network incoming to the points of presence from end-user computing devices are largely not under the control of the application service provider. For example, the network paths may traverse home network, business networks, cellular networks, or other networks not under the control of the application service provider. The capacity of these directed edges may reflect actual load on the points of presence in the application service provider's network as a result of incoming network traffic to the respective point of presence. For example, the actual load of a point of presence may be determined by measuring (e.g., from request logs) the rate of application-layer request messages sent by end-user computing devices that are received and processed at the point of presence while meeting a minimum or threshold quality of service level for the point-of-presence. The rate may be measured, for example, in terms of application-layer network request messages received per second (requests per second). The quality of service may be measured in a variety of different ways. In one way, the quality of service of a point-of-presence is measured in terms of the percentage of application-layer request messages that are received and successfully processed at the point-of-presence. A point-of-presence may be considered to meet a minimum quality of service level if at least a threshold percentage (e.g., 99.9%) of application-layer request messages received at the point-of-presence are successfully processed. Successful processing may include, for example, sending an application-layer response message within a threshold amount of time of receiving a corresponding application-layer request message and/or routing an application-layer request message to a data center within a threshold amount of time of receiving the message.

In addition, the directed edges in the graph from the data center nodes to the destination node may also be associated with a cost and a capacity. The cost of these directed edges may all be a same nominal value (e.g., zero) across all of these directed edges to reflect that the destination node represents the data centers collectively as the destination for incoming application-layer request messages sent from end-user computing devices as routed from points-of-presence and because the cost of routing application-layer request messages from the points-of-presence to the data centers is already modeled on the directed edges connecting the points-of-presence nodes of the directed graph to the data centers nodes of the directed graph. The capacity of these directed edges may reflect the estimated or actual maximum load on the data centers in the application service provider's network as a result of incoming application-layer request messages to the application service provider's network. For example, the estimated or actual maximum load of the data centers may be determined by measuring (e.g., through load testing, from request logs, and/or CPU utilization monitoring) the rate of application-layer request messages sent by end-user computing devices that are received and processed at the data centers while meeting a minimum or threshold quality of service level for the data centers. The rate may be measured, for example, in terms of application-layer network request messages received per second (requests per second). The quality of service may be measured in a variety of different ways. In one way, the quality of service of the data centers is measured in terms of the percentage of application-layer request messages that are received and successfully processed at the data centers. The data centers may be considered to meet a minimum quality of service level if at least a threshold percentage (e.g., 99.9%) of application-layer request messages received at the data centers are successfully processed. Successful processing may include, for example, sending an application-layer response message within a threshold amount of time of receiving a corresponding application-layer request message.

With this directed graph model of the online application service provider's network including the cost and capacity constraints, a minimum cost maximum flow from the source node to the destination node in the directed graph may be computed. For example, a cost-free maximum flow from the source node to the destination node may be determined considering the capacity constraints of the graph model but ignoring the cost constraints of the graph model according to a maximum flow function such as, for example, the Edmonds-Karp algorithm, the highest-label preflow-push algorithm, the shortest augmenting path algorithm or other suitable algorithm for finding a maximum single-commodity network flow from a source node for the network flow to a destination node of a directed graph having directed edges with capacity constraints.

In some implementations, the cost-free maximum flow from the source node to the destination node is considered to be the maximum application-layer request message flow into the points-of-presence. That is, the directed graph model reflects the desire of the online application service to receive and process all application-layer network request messages that flow into the points-of-presence from end-user computing devices up to the application-layer request message handling capacity of the points-of-presence. In this case, it may not be necessary to execute an algorithm (e.g., Edmonds-Karp) to determine a cost-free maximum flow. Instead, the cost-free maximum flow may be determined as the sum of the capacities associated with the directed edges in the graph from the source node to the point-of-presence nodes in the graph. This sum represents the total number of application-layer request messages per period of time (e.g., a second) that can be received and successfully processed by the points-of-presence while meeting the minimum quality of service level.

Once the cost-free maximum flow is determined, then a minimum cost flow of the cost-free maximum flow within the cost and capacity constraints satisfying all flow demands in the directed graph may be determined. The flow demands may include the source node desiring to send the cost-free maximum flow and the destination node desiring to receive the cost-free maximum flow. The point of presence and data center nodes may be considered to have a zero demand as may not inject additional application-layer request messages into the network. For example, the minimum cost maximum flow within the cost and capacity constraints satisfying all flow demands in the directed graph may be determined according to a primal network simplex algorithm or other suitable algorithm for finding a minimum cost maximum flow.

From the computed maximum flow whose total cost is minimized, a weight may be determined for each directed edge from a point of presence node to a data center node in the directed graph. In particular, each directed edge from a point of presence node to a data center node has a computed flow value for that edge as a result of computing the minimum cost maximum flow. This value is referred to herein as the "edge flow" for the edge. As such, for a given point of presence, the weight of a directed edge from the given point of presence to a data center node may be taken as the percentage (a) the edge flow value for that edge of (b) the sum of all edge flow values for all directed edges from the given point of presence node to all connected data center nodes. For example, if a given point-of-presence node $N_{pop-1}$ is connected to three data center nodes $N_{dc-1}$, $N_{dc-2}$, $N_{dc-3}$ by three respective directed edges $E_1$, $E_2$, $E_3$ and having three respective edge flow values $F_1$, $F_2$, $F_3$, then the weights of the data centers represented by nodes $N_{dc-1}$, $N_{dc-2}$, $N_{dc-3}$ for the point of presence represented by node $N_{pop-1}$ may be computed as $F_x/F_1+F_2+F_3$ for each of x=1, x=2, and x=3, respectively.

Application-layer network request messages received at the given point-of-presence may then be routed to the connected data centers in weighted round robin fashion according to the determined weights/percentages. For example, if a given point-of-presence is connected to three data centers DC-1, DC-2, and DC-3, and the weights determined for the given point-of-presence and the three data centers is 80%, 18%, and 2%, respectively, then 80% of all application-layer network request messages received at the given point-of-presence may be routed to data center DC-1, 18% to data center DC-2, and 2% to data center DC-3.

The above process may be repeated periodically (e.g., every minute, every five minutes, etc.) to adapt to changing network conditions based on new updated cost and/or capacity measurements. In this way, application-layer routing configuration for points-of-presence can be automatically determined and better adapt to changing network conditions and fluctuations in application-layer request message load.

Example Network

FIG. 1 illustrates an example data communications network 100 for sending and receiving network messages, according to some implementations. For example, the network may support, among other network communications protocol, the internet protocol (IP) for relaying datagrams between network communications devices in the network.

The network may have a number of horizontal layers by which network communications devices (e.g., computers systems, routers, hubs, switches, Internet of Things (IoT) devices, etc.) in the network are categorized, according to some implementations. For example, the network may have a source layer 110, an edge layer 120, and a destination layer 130. The source layer may contain a number of source devices (e.g., source device 111-1, 111-2, . . . , 112-X), the edge layer may contain a number of edge devices (e.g., 121-1, 121-2, . . . , 121-Y), and the destination layer may contain a number of destination devices (131-1, 131-2, . . . , 131-Z). The number (X) of source devices in the source layer may be different than the number (Y) of edge devices in the edge layer which may be different (Z) than the number of destination devices in the destination layer.

A source device in the source layer may send an application layer network message that may be received by an edge device in the edge layer. The application layer network message can be a network message that conforms to a communications protocol in the application layer of the Open Systems Interconnect (OSI) networking model, otherwise known as "Layer 7." For example, an application layer network message may conform to a variety of different application layer network communications protocols including, but not limited to, the border gateway protocol (BGP), the dynamic host configuration protocol (DHCP), the domain name system (DNS) protocol, the file transfer protocol (FTP), the hypertext transfer protocol (HTTP), the secure hypertext transfer protocol (HTTPS), the internet message access protocol (IMAP), the simple mail transfer protocol (SMTP), the secure shell (SSH) protocol, the telnet protocol, the simple object access protocol (SOAP), or other OSI Layer 7 communications protocol.

Similarly, an edge device in the edge layer may send an application layer network message that is received by a destination device in the destination layer. It is also possible for an edge device (e.g., 121-1) in the edge layer to send an application layer network message that is received by another edge device (e.g., 121-2) in the edge layer.

While it is possible that every edge device in the edge layer is capable of receiving an application layer network message sent by any source device in the source layer, this may not be possible because of the physical topology or configuration (e.g., Domain Name Service (DNS) configuration) of the network. Similarly, while it is possible that every edge device in the edge layer is capable of receiving an application layer network message sent by every other edge device in the edge layer, such may not be possible because of the physical topology or application-layer configuration of the network. Likewise, while it is possible that every destination device in the destination layer is capable of receiving an application layer network message sent by any edge device in the edge layer, this may not be possible because of the physical topology or configuration of the network. As such, there may be various different paths (e.g., 140-1, 140-2, 140-3, 140-4) in the network by which an application layer message can be sent by a source device and received by an edge device, various different paths (e.g., 140-5) in the network by which an application layer message can be sent by an edge device and received by another edge device, and various different paths (e.g., 140-6, 140-7, 140-8, 140-9, 140-10) in the network by which an application layer message can be sent by an edge device and received by a destination device. For example, in the example network 100, there is a path 140-1 in the network 100 by which an application layer network message sent by source device 111-1 can be received by edge device 121-1 but no path by which an application layer network message sent by source device 111-1 can be received by edge device 121-2.

In the example network 100, there are no depicted paths between certain devices in the network simply to illustrate the point that there may be no path in the network between any two selected devices. In other words, the network may be only partially connected and not fully connected. However, it is also possible for network to be fully connected such that every device in the network has a path to every other device in the network.

Source devices in source layer may send application layer network messages along available paths that are received by edge devices in the edge layer. For example, source devices may correspond to end-user networked personal computing devices in the network that are configured to send HTTP/S requests that are received along paths by edge devices in the network. Similarly, edge devices in edge layer may send application layer network message along available paths 140 that are received by other edge devices 121 in edge layer 120. For example, edge devices may correspond to HTTP/S web servers at various different geographically distributed points-of-presence (POPs). For example, an edge device 121-1 (e.g., a web server device in Hong Kong) that receives an HTTP/S request sent by a source device 111-1 (e.g., an end-user device in Hong Kong) may forward that HTTP/S request such that it is received by another edge device 121-2 (e.g., a web server device in Japan). Likewise, edge devices in edge layer may send application layer network messages along available paths in network that are received by destination devices. For example, source device 111-1 (e.g., an end-user device in Hong Kong) may send an HTTP/S request along path 140-1 that is received by edge device 121-1 (e.g., a web server device in Hong Kong) which in turn may send a related HTTP/S request along path 140-5 that is received by edge device 121-2 (e.g., a web server device in Japan) which in turn may send a related HTTP/S request along path 140-7 that is received by destination device 131-2 (e.g., a web server device in San Jose, Calif., USA).

An edge device that receives an application layer network message from a source device or another edge device may determine that it can completely handle/process the application network layer message without having to send a related application layer network message that is received by a destination device or another edge device. For example, edge device 121-1 may receive an application layer network request sent by source device 111-1 and determine that it can completely handle/process the application network layer message without having to send a related application layer network message that is received by edge device. In some implementations, application-layer network messages that are completely handled/processed at a point-of-presence are not included/considered in the capacity calculation for the directed edge incoming to node representing the point-of-presence as such message are not routed by the point-of-presence to a data center.

In some implementations, the edge layer and the destination layer are operated by an application service provider and the source devices of the source layer include the personal computing devices of end-users of the application service. The personal computing devices may include virtually any network-capable personal computing device capable of participating as a device in network including, but not limited to, network-enabled smart phones, laptop computers, tablet computers, workstation computers, desktop computers, internet-of-things (IoT) devices, or the like.

It should be noted that in the case that a source device is a personal computing device of an end-user, it is not necessary that an application layer network message sent by the source device be triggered by user input to the personal computing device, although it can be. For example, an application installed on the personal computing device may send an application layer network message that is received by an edge device in response to another type of triggering event detected as the personal computing device such as, for example, the expiration of a timer or receiving a network message from another networked computing device.

In some implementations, edge devices are web/application servers at points-of-presence (POPs) operated by an application service provider at the edge of the network. In these implementations, some edge devices may be physically located where they are geographically closer to some source devices than any destination devices are to those source nodes. For example, edge devices may be located in regions where certain end-users of the application service are located. For example, edge device 121-1 may be located in Hong Kong to serve end-users located in Hong Kong and/or other nearby end-users and edge device 121-2 may be located in Japan to serve end-users located in Japan and/or other nearby end-users. If all destination devices in destination layer 130 are located in North America, then edge devices 121-1 and 121-2 are both geographically closer to end-users in Hong Kong and Japan than any destination devices in North America.

An application service may provision edge devices in certain geographic regions to better serve end-users in those regions. Because the regional edge devices are geographically closer to the end-users in those regions, they can generally receive application layer network messages sent by source devices in those regions sooner than any destination device could receive those messages. As a result, the regional edge devices can generally process and respond to the application layer network messages faster than any destination device could.

However, it may be case that an application layer network message received by an edge device cannot be completely processed by the receiving edge node and, as a result, the receiving edge node must send a related application layer network message to the destination layer for further processing. For example, source device 111-2 may send an HTTP/S request message that is received by edge device 121-2. Edge device 121-2 may analyze the HTTP/S request and determine that it requests information that is not available at the edge device 121-2 but is available from the destination layer 130. Alternatively, edge device 121-2 may be configured to forward any received HTTP/S request messages onto the destination layer 130 without a prior determination of whether the received HTTP/S request message can be processed completely at the edge device 121-2. In either case, edge device 121-2 may send a related HTTP/S request message that is received by destination device 131-2. The related HTTP/S request message can be the same HTTP/S request message received from the source device 111-2 or include content of the HTTP/S request message received from the source device 111-2 such as, for example, some or all the request headers and the request body of the HTTP/S request message received from the source device 111-2. The related HTTP/S request message sent from the edge device 121-2 may reflect some processing by the edge device 121-2 on the HTTP/S request message received from the source device 111-2 such as, for example, replacement, modification, or removal of request headers and/or transformation of the request body (e.g., encryption, decryption, or other processing of the request body that alters the encoding and/or encryption of request body). Other processing and/or transformation by the edge device 121-2 may be performed according to the requirements of the implementation at hand.

It should be noted that each path through the network 100 may actually be composed of one or more physical network links. Each such physical network link can be wired or wireless. A physical network link can be provided by a variety of different physical layer techniques including, but not limited to, Ethernet (e.g., 100BASE-T, etc.), GSM UM air interface, G.hn/G.9960, Optical Transport Network (OTN), SONET/SDH, IEEE 802.11 Wi-Fi, etc.

The above-example description of an example network with source devices, edge devices, and destination devices is provided as a framework for the following discussion of techniques for centralized application-layer routing at the edge of an application service provider network.

Example Application Service Provider Network

Figure 2:
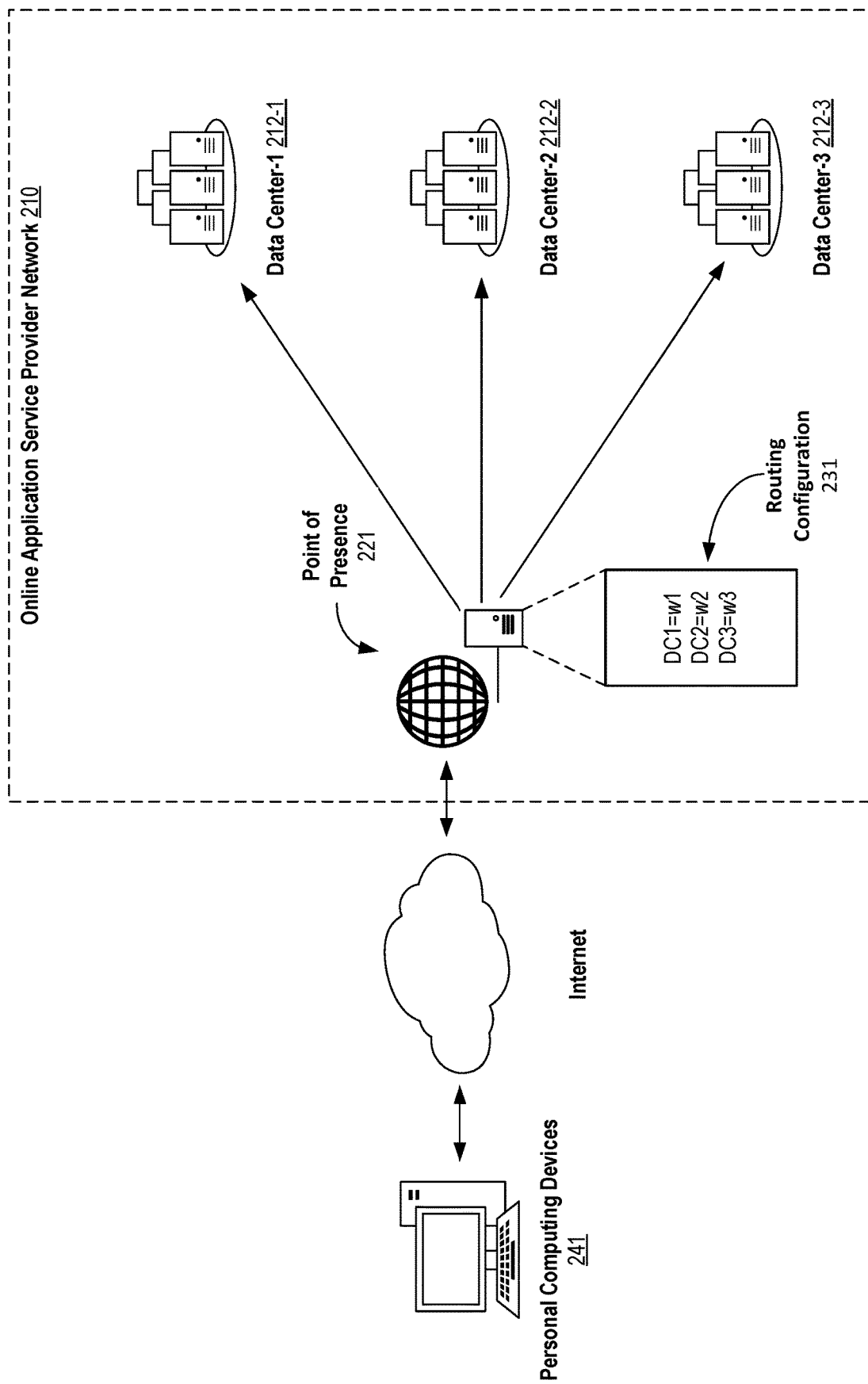
FIG. 2 illustrates an example online application service provider network, according to some implementations.

FIG. 2 illustrates an example data communications network 210 of an application service provider, according to some implementations. The application service provider network includes a point of presence 221 at the edge of the network 210 and three data centers 212-1, 212-2, and 213-3. While only one point of presence is depicted in FIG. 2 for the purposes of providing a clear example, there may be more than one point of presence in an application service provider network in a given implementation. For example, the application service provider network may have multiple points of presence (e.g., on the order of 10 or 20 points of presence) at various locations around the world. Similarly, while only three data centers are depicted in FIG. 2 for the purpose of providing a clear example, there may be more than three or as few as two data centers in a given implementation.

A data center may include one or more destination devices co-located together in the same geographic location. For example, data center-1 212-1, data center 212-2, and data center 212-3 may each be located in different cities. A point of presence may include one or more edge devices co-located together in the same geographic location. For example, point of presence 221 may be located in a city in which none of the data centers 212-1, 212-2, and 212-3 are located.

The distinction between a point of presence and a data center may be a functional one. In particular, a functional hallmark of a point of presence is the ability to receive "source" application layer network messages sent by source devices (e.g. personal computing devices 241) sent over the internet or other data communications network and then send a related application layer network request to a data center for further processing. For example, the source application layer network message may request certain data provided by the application service. The point of presence 221 receiving the source application layer network message may send a related application layer network message to one of the data centers 212-1, 212-2, or 212-3 requesting the certain data, assuming all of the data centers 212-1, 212-2, and 212-3 are capable of serving the requested data. For example, the requested data may be replicated among data centers 212-1, 212-2, and 21-3 for high availability.

The data center (212-1, 212-2, or 212-3) that the point of presence 221 selects can affect how quickly the requested data is obtained from the selected data center and ultimately how quickly the requested data is returned to the source device. Some factors that can affect how quickly the requested data is obtained from the selected data center include the current request load on the selected data center, the capacity of the network path between the point of presence 221 and the selected data center, and the cost to send the related application layer network message from the point of presence 221 to the selected data center. The current request load on the selected data center may fluctuate over time. For example, during peak business hours of the local time zone where the data center is located, the request load on the selected data center may be relatively high. Whereas the request load may be relatively low during the middle of the night there. The capacity of the network path between the point of presence 221 and the selected data center may be a function of, among other things, the capacity of the physical network links that provide the network path. The cost to send messages along the network path may be a function of, among other things, the geographic distance between the point of presence 221 and the selected data center where generally greater distances result in higher costs and shorter distances result in lower costs. As such, the decision by the point of presence 221 of which data center to select is an important one and can have a substantial impact on the end-user's perception of the performance of the application service.

To aid in the selection of a data center for the related application layer message, the point of presence 221 may be configured with an application layer routing configuration 231. The routing configuration 231 may specify or indicate, for each of the data centers 212-1, 212-2, and 212-3, a request allocation weight that determines how the point of presence 221 distributes related application layer network messages over the data centers 212-1, 212-2, and 212-3. For example, if the weight w1 for data center-1 212-1 is 90%, the weight w2 for data center-2 212-2 is 10%, and the weight w3 for data center-3 212-3 is 0%, then, in this configuration, point of presence 221 may route 90% of the application layer network messages it receives from personal computing devices 241 that are to be routed to a data center to data center-1 212-1, 10% of those messages to data center-2 212-2, and none of those messages to data center-3 212-3. Here, the term "route" is used in the sense that the point of presence 221 sends a related application layer network message to a selected data center (e.g., 212-1) that is based on an application layer network message received from a personal computing device. The term "forward" may also be used herein in the same sense.

Whether a point of presence is described herein as "routing" or "forwarding" a "source" application layer network message sent by a personal computing device and received by the point of presence, the related application layer network message sent in response by the point of presence to a data center may be exactly the same as the source application layer network message but it need not be. For example, the source and related application layer network messages may have different headers. However, often the source and related application layer network messages have the same message body, but there is no requirement that this be the case. Also, the application layer network message sent by the personal computing device may not be exactly the same as the application layer network message received by the point of presence. This can happen if one or more intermediary network devices process the message sent by the personal computing device at the application layer. Thus, the term "source application layer network message" refers to an application layer network message sent by a source device as it is received by an edge device.

As mentioned in the foregoing Background section, the routing configuration 231 for a point of presence 221 is conventionally maintained manually by human network engineers of the application service provider. In particular, the network engineers may judge or estimate or use heuristics determine the weights to assign to the data centers in the routing configuration 231 for a given point of presence. These weights are then statically set in the routing configuration 231 for that point of presence. This is sub-optimal. For one, it does not scale well. For example, if an application service provider network contains twenty points of presence, then if a data center is brought offline, then up to twenty routing configurations may need to be updated both before the data center is brought offline and again after the data center is brought back online again. Similar scalability problems exist when introducing a new point-of-presence to the network. Note that different points of presence may use different weights for the same data center based on the respective different load, capacity, and cost factors for the points of presence. Another reason this manual maintenance approach is sub-optimal is that it is more difficult to respond to changing network conditions due to its manual nature. As such, assigned weights that are suitable for one set off network conditions may not be suitable or less than optimal for another set of network conditions. Further, the estimates and judges made by the human engineers may be inaccurate resulting in assigned weights that sub-optimal such that some data centers may be overloaded, and/or some data centers may be underutilized.

Minimum Cost Maximum Application-Layer Request Message Flow Approach

To address the foregoing issues and other issues, a more automated and potentially more accurate approach for determining the weights to assign to data centers in the application layer routing configurations of points of presence is proposed. The approach uses a minimum cost maximum flow algorithm for determining a maximum flow in an application service provider network having a minimized total cost from a hypothetical source node in the network to a hypothetical destination node in the network. In some implementations, the hypothetical network source desires to send a maximum network flow and the hypothetical destination in the network desires to receive the maximum network flow.

The approach initially represents the application service provide network as a directed graph with edge costs and capacities. Included in the directed graph is the hypothetical source node and the hypothetical destination node. Also included in the directed graph are nodes representing points of presence in the application service provider network and nodes representing data centers in the application service provider network. The nodes representing points of presence are connected by edges in the directed graph with nodes representing data centers for which there are corresponding paths in the application service provider network. A minimum cost maximum flow algorithm is then applied to the directed graph with the designated edge costs and capacities and with designated hypothetical source and destination nodes to find a maximum flow from the hypothetical source node to the hypothetical destination node whose total cost is minimized and within the edge capacity constraints. The output of the algorithm may include an edge flow value for each edge in the directed graph from a point of presence node to each data center node that the point of presence node is connected to in the directed graph. The routing configuration weights for a given point of presence can be determined from the ratio of the edge flow values computed for the edges connecting the node for the given point of presence in the directed graph to nodes for data centers in the directed graph. In this way, optimal application layer routing configuration weights can be determined for points of presence in the application service provider network in a way that maximizes total network flow in the network at a minimum total cost.

The process may be repeated as often as necessary to update routing configuration weights. For example, the process may be repeated on a periodic basis such as hourly, daily, weekly, every ten minutes, every five minutes, every minute, or on another time schedule. The process may be performed before and after a planned data center outage. For example, the process may be performed before a planned data center outage by omitting the node representing the data center and the incoming edges thereto from the directed graph that is input to the maximum flow minimum cost algorithm to determine the optimal max flow min cost weights for when the data center is offline. The process may be performed again after the data center comes back online by reintroducing the node and incoming edges to the directed graph input. The process may also be performed in response to detecting a significant change (e.g., more than a threshold change) in the cost or capacity of the network path connecting a point of presence to a data center and/or when there is a significant change in the rate of incoming application-layer request messages into a point-of-presence. For example, the process may be performed with a new cost and/or new capacity for the edge in response to detecting that the new cost and/or new capacity represents more than a threshold increase or decrease over a prior cost and/or a prior capacity of the edge.

Solving for the maximum flow with a minimum total cost may involve determining a minimum cost flow between the hypothetical source node having negative demand at a maximum flow and the hypothetical destination node having positive demand at the maximum flow. The maximum flow may be determined according to a variety of different algorithms including, for example, the Edmonds-Karp algorithm, the highest-label preflow-push algorithm, the shortest augmenting path algorithm, or other algorithm suitable for computing the maximum flow within the capacity constraints of the network and ignoring the cost constraints. The maximum flow whose total cost is minimized may be determined according to a variety of different algorithms including for example, the primal network simplex algorithm or other algorithm suitable for computing the minimum cost flow within the cost and capacity constraints of the network and where the negative demand in the network is equal to the negative maximum cost-free flow determined and the positive demand in the network is equal to the positive maximum cost-free flow determined.

Example Network Model

Figure 3:
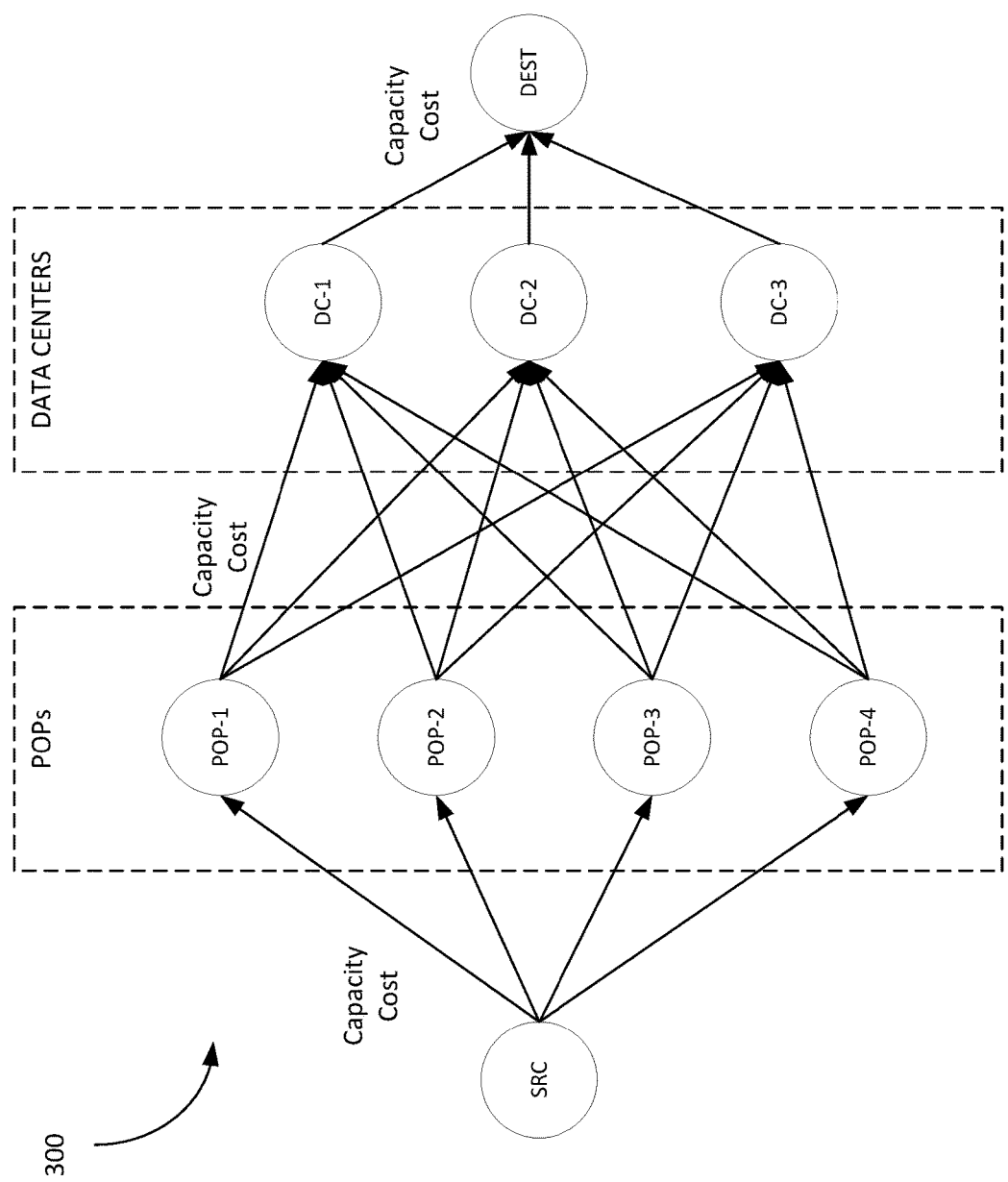
FIG. 3 illustrates a directed graph representing an online application service provider network, according to some implementations.

FIG. 3 illustrates an example directed graph 300 modelling an application service provider network, according to some implementations. A data structure representing the directed graph 300 may be input to a maximum flow at a minimum total cost algorithm to determine the maximum flow at the minimum total cost for the application service provide network given costs and capacity constraints associated with the edges of the directed graph.

The directed graph 300 includes a number of nodes (e.g., POP-1, POP-2, POP-3, POP-4) representing points of presence in the application service provider network. The graph 300 also includes a number of nodes (e.g., DC-1, DC-2, DC-3) representing data centers in the application service provider network. The graph 300 further includes a hypothetical source node (e.g., SRC) and a hypothetical destination node (e.g., DEST). The source node SRC represents the sources of incoming network traffic/flow collectively to the points of presence in the application service provider network. The destination node DEST representing the incoming traffic/flow to the data centers DC-1, DC-2, and DC-3 collectively.

Each point of presence node in the graph 300 is associated with an incoming directed edge from the SRC node. The edge represents the incoming network traffic/flow to the point of presence node. The edge may be associated with a capacity and a cost. In some implementations, the capacity is measured as the number of application layer network messages per unit of time that the point of presence receives and processes during a period of time. For example, the capacity can be an average of the HTTP/S request messages per second received and successfully processed by the point of presence in a past period of time (e.g., the past hour, the past ten minutes, the past five minutes, the past minute, etc.)

In some implementations, the cost of each of the edges from the SRC node to the point of presence nodes is the same (e.g., zero) to represent that the application service provider is generally has little or no control over the quality, availability, and bandwidth of the physical network links that connect end-users' computing devices to the points of presence. Further, the application service provider desires to serve all incoming application-layer request messages incoming into the points-of-presence.

Each point of presence node in the graph 300 also has one or more outgoing directed edges from the point of presence node to one or more data center nodes. A point of presence node may have at least one outgoing directed edge in the directed graph for every data center in the application service provider's network where there is a path in the network from the point of presence to the data center. There may be more than one path through the network from the point of presence to the data center. For example, the data center may be reachable at multiple different network addresses. In this case, there may be multiple outgoing directed edges in the graph from the node representing the point of presence to the node representing the data center. While in some implementations each point of presence has a path in the network to every data center as depicted in FIG. 3, this may not be the case, however. As such, there may be no outgoing edge connecting a point of presence node in the directed graph to a data center node if there is no path in the network between the point of presence and the data center.

Each directed edge between a point of presence node in the graph 300 and a data center node may be associated with a cost and a capacity. In some implementations, the capacity is measured as the number of bits per unit of time of the available bandwidth of the physical links underlying the respective path through the network as converted to application-layer request messages per the unit of time. Alternatively, the capacity can be the maximum capacity of the physical links measured, for example, in terms of gigabits per second. As yet another alternative, the capacity can be considered to be infinite to reflect that the application service provider is under control of the bandwidth to the underlying physical links and can provision more bandwidth if the current maximum capacity is reached.

In some implementations, the cost of each of the edges from a point of presence node to a data center node is measured as a round-trip time (e.g., a UDP ping time or a TCP ping time) for a packet or set of network packets sent between the point of presence and the data center at the other end of the edge. For example, the cost for the edge can be an historical average round trip time between the point of presence and the data center based on a series of round-trip time samples obtained during a period of time. Alternatively, the cost may be defined as a utility function of a round-trip-time. However, a round-trip-time may also be used directly as the cost.

It should be noted that the physical links underlying the paths corresponding the edges between points of presence nodes and data center nodes in the directed graph may be regularly or continuously monitored for actual bandwidth allocated/available and actual round-trip times. For example, round-trip time measurements of physical network links may be obtained regularly and periodically for a period of time and then aggregated (e.g., averaged). Then the results of the aggregation may be used as costs associated with directed edges in the directed graph.

Each data center node in the graph 300 is associated with an outgoing directed edge to the DEST node. The edge represents the incoming network traffic/flow to the data center node. The edge may be associated with a capacity and a cost. In some implementations, the capacity is measured as the number of application layer network messages per unit of time that the data center is capable of receiving and processing or that, according to monitoring information obtained from logs, etc., the data center has actually received and processed during a period of time. For example, the capacity can be an historical average of the HTTP/S request messages per second received and processed by the destination devices of the data center.

In some implementations, the cost of each of the edges to the DEST node to the point is the same (e.g., zero). Alternatively, these edges may be associated with a cost that reflects an actual cost to the application service provider of running the associated data center.

Figure 4:
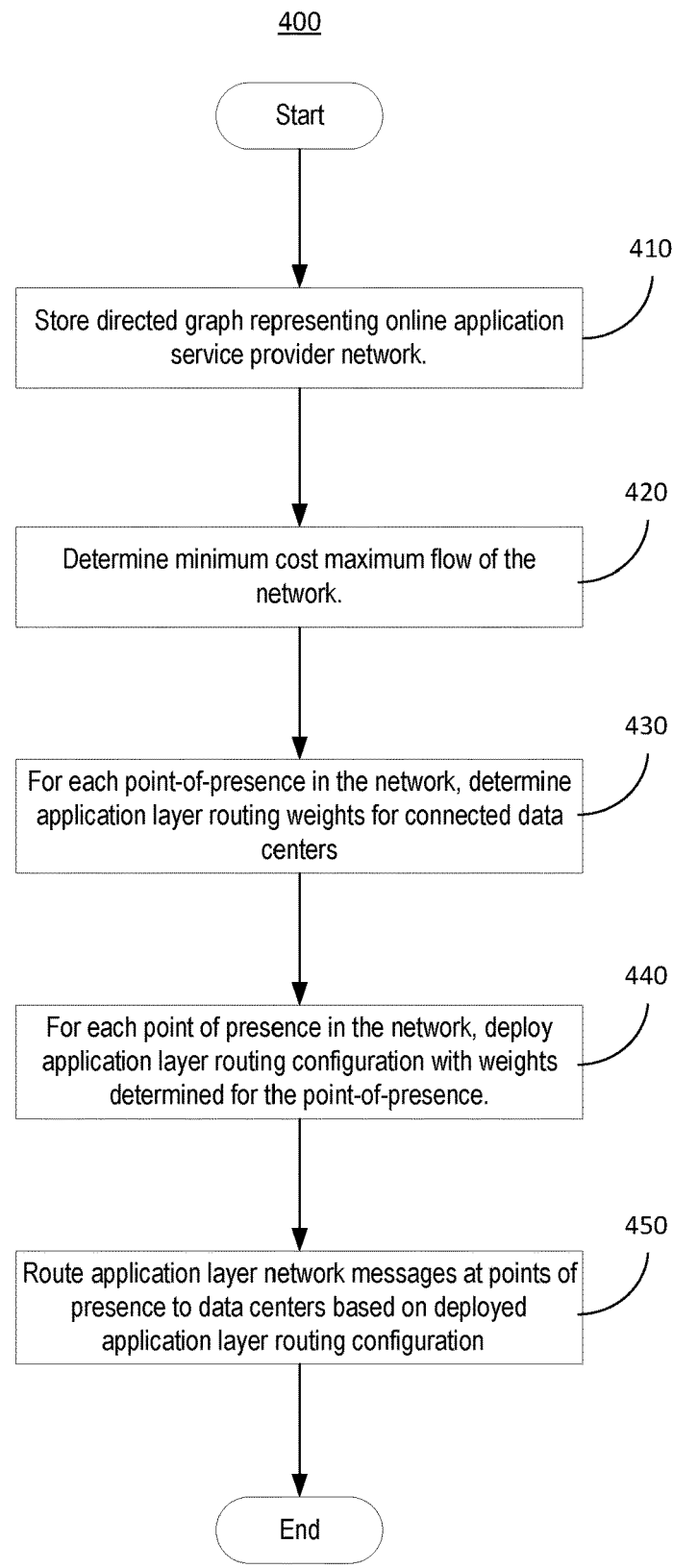
FIG. 4 is a flowchart of a process for centralized application-layer routing at the end of an online application service provider network, according to some implementations.

Example Process for Centralized Application-Layer Routing at an Edge of an Application Service Provider Network FIG. 4 illustrates a process 400 for centralized application-layer routing at an edge of an application service provider network, according to some implementations. In summary, the process proceeds by storing 410 a directed graph representing the application service provider network. Using the directed graph representation, the minimum cost maximum flow in the network is determined 420. Then, based on the minimum cost maximum flow determined 420, for each point-of-presence in the network, an application layer routing weight is determined 430 for each data center that the point-of-presence has a path to in the network. Once the weights are determined for a point-of-presence, an application layer routing configuration containing the determined 430 weights is deployed 440 to the point-of-presence. This deployment 440 may be performed for each point-of-presence in the network. Each point-of-presence then routes 450 received application layer network messages to data centers in the network according to the deployed 440 routing configuration.

Steps 410, 420, 430, and 440 may be repeated together as often as required so as to reflect the most recent conditions in the network. For example, those steps may be repeated together on a regular basis such as once an hour, once a day, once a week, every ten minutes, every five minutes, every minute, etc. As another example, those steps may be repeated together in response to detecting an event such as a change in the conditions of the network. Some example changes in the conditions of the network that might trigger performance of those steps include, but are not limited to, a significant increase or decrease (e.g., above or below a predetermined threshold) over a period of time (e.g., an hour) in the measured bandwidth of a physical network link or links connecting a point-of-presence to a data center that is actually being used, a significant increase or decrease over a period of time in the measured round-trip time over a physical network link or links connecting a point-of-presence to a data center, a significant increase or decrease over a period in the measured application layer messages received and processed per unit of time by a point-of-presence, or a significant increase or decrease over a period of time in the measured application layer messages received and processed per unit of time by a data center. As yet another example, those steps may be repeated on demand such as in response to a user command by user input to a computer system to perform the steps issued by a network administrator or the like.

Returning to the top of process 400, a directed graph representing an application service provider's network is stored in a suitable data structure format (e.g., adjacency list, associative array, dictionary, etc.) The directed graph may include nodes and directed edges connecting the nodes. To facilitate minimum cost maximum flow calculation, the directed graph may include a hypothetical source node and a hypothetical destination node as described above. The directed graph may also include nodes representing points-of-presence in the application service provider's network and nodes representing data centers in the application service provider's network. In particular, each point-of-presence may be represented by a respective node in the directed graph and each data center may be represented by a respective node in the directed graph.

Each directed edge in the directed graph may be associated with a cost and a capacity. The cost for directed edges between point-of-presence nodes and data center nodes can be measured in a variety of different ways including, but not limited to, based on UDP and/or TCP round-trip times over the physical network links connecting the points-of-presence and the data centers. The capacity for directed edges between point-of-presence nodes and data centers nodes can be measured in a variety of different ways including, but not limited to, based on the maximum bandwidth over the physical network links connected the points-of-presence and the data centers.

The directed edges of the directed graph incoming the point-of-presence nodes may also be associated with a cost and capacity. For example, the cost of these edges may be the same (e.g. zero) for all such edges in the directed graph. The capacity of an edge incoming to a point-of-presence node may be measured in a variety of different ways including, but not limited to, based on the actual application layer network messages (e.g., HTTP/S request messages) per unit of time (e.g., per second) received and processed by the point-of-presence.

The directed edges of the directed graph outgoing from the data center nodes to the hypothetical destination node may also be associated with a cost and capacity. For example, the cost of these edges may all be the same (e.g., zero). The capacity of an edge outgoing from a data center node may be measured in a variety of different ways including, but not limited to, based on the estimated maximum application layer network messages (e.g., HTTP/S request messages) per unit of time (e.g., per second) the data center is capable of receiving and processing.

At step 420, the directed graph with the associated costs and capacities is the input to a minimum cost maximum flow algorithm to determine a maximum network flow from the hypothetical source node to the hypothetical destination node whose total cost is minimized. As a result of performing the algorithm on the directed graph, each directed edge in the graph from a point-of-presence node in the graph to a data center node in the graph is associated with a computed edge flow value.

At step 430, for each point of presence that is represented by a respective node in the directed graph, an application layer routing weight is determined for each data center that the point of presence is connected with by a directed edge in the directed graph. For this, the ratio of the computed edge flow values associated with the directed edges may be used. For example, if a point-of-presence node is connected to three data centers nodes in the directed graph by three respective directed edges and the computed edge flow value for those directed edges in step 420 is: X for data center-1, Y for data center-2, and Z for data center-3, then the weights may be computed based on the ratio X/Y/Z.

At step 440, for each point of presence that is represented by a respective node in the directed graph, an application layer routing configuration is deployed to the point of presence. The configuration contains the weights for respective data centers as computed at step 430.

At step 450, points of presence route received application layer network messages to data centers based on the current application layer routing configuration deployed 440. For example, the current application layer routing configuration for a point-of-presence may weight data centers A, B, and C as 75%, 20%, and 5%, respectively. As such, the point-of-presence will route 75% of the application layer network messages it receives to data center A, 20% to data center B, and 5% to data center C. Note that the weights may apply only to application layer network messages that are to be routed from the point-of-presence to a data center and application layer network messages that are not to be routed (e.g., because they can be completely processed at the point-of-presence) may not affect the allocation of messages that are to be routed among the data centers.

Example Computer System

Some implementations encompass performance of a method by a computing system having one or more processors and storage media. The one or more processors and the storage media may be provided by one or more computer systems. The storage media of the computing system may store one or more computer programs that include instructions configured to perform the method and that are executed by the one or more processors to perform the method.

For an implementation that encompasses multiple computer systems, the computer systems may be arranged in a distributed, parallel, clustered or other suitable multi-node computing configuration in which computer systems are continuously, periodically, or intermittently interconnected by one or more data communications networks (e.g., one or more internet protocol (IP) networks.) Further, it need not be the case that the set of computer systems that execute the instructions be the same set of computer systems that provide the storage media storing the one or more computer programs, and the sets may only partially overlap or may be mutually exclusive.

Figure 5:
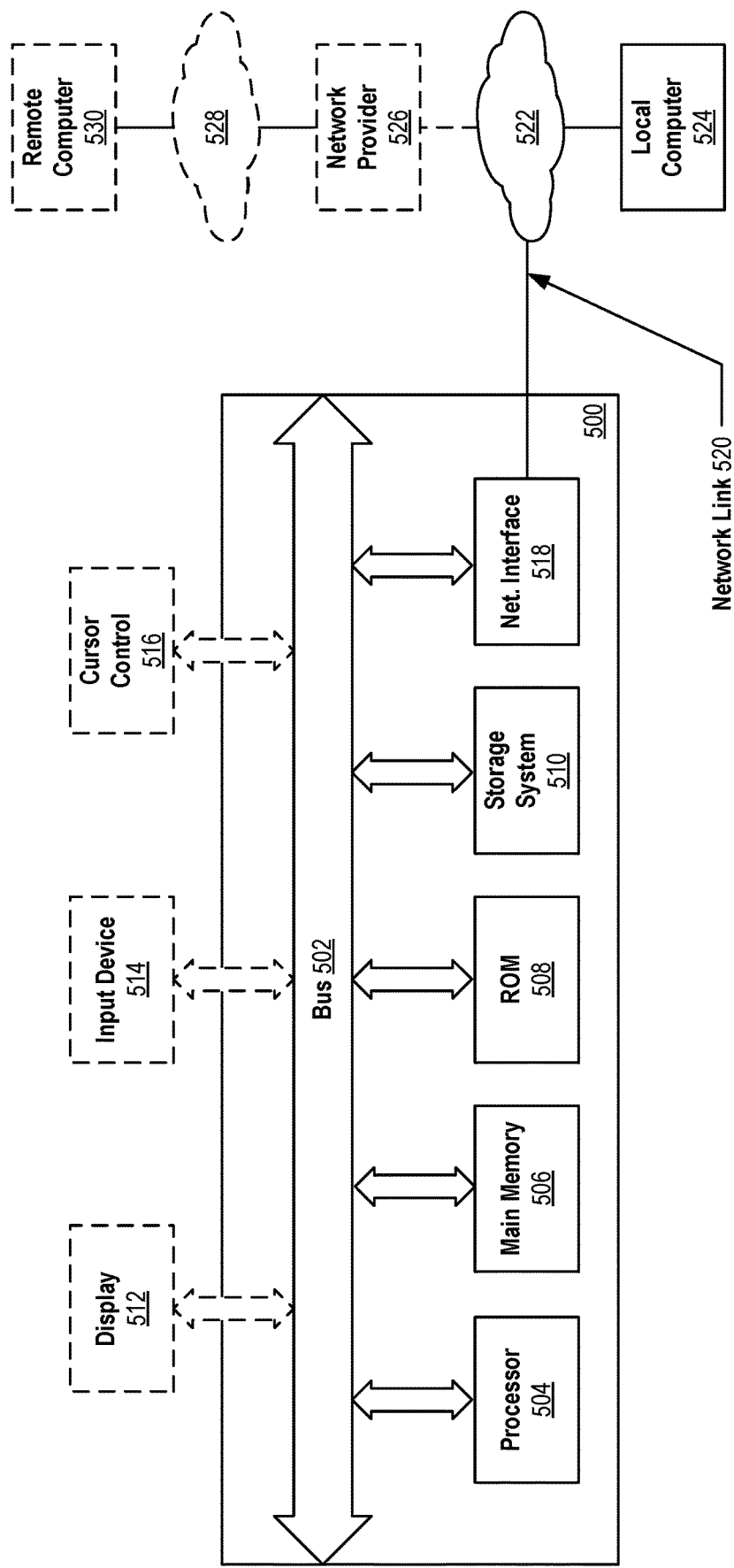
FIG. 5 illustrates an example computer system, according to some implementations.

FIG. 5 is a block diagram of an example computer system 500 in accordance with some implementations. Computer system 500 includes bus 502 or other communication mechanism for communicating information, and one or more hardware processors coupled with bus 502 for processing information. Hardware processor 504 may be, for example, a general-purpose microprocessor, a central processing unit (CPU) or a core thereof, a graphics processing unit (GPU), or a system on a chip (SoC).

Computer system 500 also includes a main memory 506, typically implemented by one or more volatile memory devices, coupled to bus 502 for storing information and instructions to be executed by processor 504. Main memory 506 also may be used for storing temporary variables or other intermediate information during execution of instructions by processor 504. Computer system 500 may also include read-only memory (ROM) 508 or other static storage device coupled to bus 502 for storing static information and instructions for processor 504. A storage system 510, typically implemented by one or more non-volatile memory devices, is provided and coupled to bus 502 for storing information and instructions.

Computer system 500 may be coupled via bus 502 to display 512, such as a liquid crystal display (LCD), a light emitting diode (LED) display, or a cathode ray tube (CRT), for displaying information to a computer user. Display 512 may be combined with a touch sensitive surface to form a touch screen display. The touch sensitive surface is an input device for communicating information including direction information and command selections to processor 504 and for controlling cursor movement on display 512 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 514, including alphanumeric and other keys, may be coupled to bus 502 for communicating information and command selections to processor 504.

Another type of user input device may be cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Instructions, when stored in non-transitory storage media accessible to processor 504, such as, for example, main memory 506 or storage system 510, render computer system 500 into a special-purpose machine that is customized to perform the operations specified in the instructions. Alternatively, customized hard-wired logic, one or more ASICs or FPGAs, firmware and/or hardware logic which in combination with the computer system causes or programs computer system 500 to be a special-purpose machine.

A computer-implemented process may be performed by computer system 500 in response to processor 504 executing one or more sequences of one or more instructions contained in main memory 506. Such instructions may be read into main memory 506 from another storage medium, such as storage system 510. Execution of the sequences of instructions contained in main memory 506 causes processor 504 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 510) and/or volatile media (e.g., main memory 506). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 502. Transmission media can also take the form of acoustic or light waves, such as those generated during radio-wave and infra-red data communications.

Computer system 500 also includes a network interface 518 coupled to bus 502. Network interface 518 provides a two-way data communication coupling to a wired or wireless network link 520 that is connected to a local, cellular or mobile network 122. For example, communication interface 518 may be IEEE 802.3 wired "ethernet" card, an IEEE 802.11 wireless local area network (WLAN) card, a IEEE 802.15 wireless personal area network (e.g., Bluetooth) card or a cellular network (e.g., GSM, LTE, etc.) card to provide a data communication connection to a compatible wired or wireless network. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through network 522 to local computer system 524 that is also connected to network 522 or to data communication equipment operated by a network access provider 526 such as, for example, an internet service provider or a cellular network provider. Network access provider 526 in turn provides data communication connectivity to another data communications network 528 (e.g., the internet). Networks 522 and 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the networks 522 and 528, network link 520 and communication interface 518. In the internet example, a remote computer system 530 might transmit a requested code for an application program through network 528, network 522 and communication interface 518. The received code may be executed by processor 504 as it is received, and/or stored in storage device 910, or other non-volatile storage for later execution.

Terminology

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both user interfaces, but they are not the same user interface.

The terminology used in the foregoing detailed description and in the appended claims of the various described implementations herein is for the purpose of describing particular implementations only and is not intended to be limiting. As used in the foregoing detailed description and in the appended claims of the various described implementations, the singular forms "a," "an," and "the" are intended to include the plural forms as well, unless the context clearly indicates otherwise. It will also be understood that the term "and/or" as used in the foregoing detailed description and in the appended claims refers to and encompasses any and all possible combinations of one or more of the associated listed items. It will be further understood that the terms "includes," "including," "comprises," and/or "comprising," when used in the foregoing detailed description and in the appended claims, specify the presence of stated features, integers, steps, operations, elements, and/or components, but do not preclude the presence or addition of one or more other features, integers, steps, operations, elements, components, and/or groups thereof.

As used in the foregoing detailed description and in the appended claims, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

For situations in which implementations discussed above collect information about users, the users may be provided with an opportunity to opt in/out of programs or features that may collect personal information. In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Extensions and Alternatives

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

The invention claimed is:

1. A method, comprising:
   storing a data structure representing a directed graph, the directed graph representing an application service provider network, the directed graph having nodes and directed edges, the nodes including a first plurality of nodes representing a plurality of points-of-presence in the application service provider network and including a second plurality of nodes representing a plurality of data centers in the application service provider network;
   using the data structure to compute a minimum cost maximum flow of the application service provider network;
   based on the minimum cost maximum flow, determining a respective weight for a particular data center, of the plurality of data centers, that is reachable at an application network layer from a particular point-of-presence, of the plurality of points-of-presence;
   receiving a first application-layer request message at the particular point-of-presence;
   based on the respective weight, selecting the particular data center to which to route the first application-layer request message;
   in response to the selecting the particular data center, sending a second application-layer request message that is based on the first application-layer request message from the particular point-of-presence, wherein the second application-layer request message is received at the particular data center; and
   wherein the method is performed by a computing system having one or more processors and storage media storing one or more programs for execution by the one or more processors, the one or more programs including instructions configured to perform the method.

2. The method of claim 1, wherein:
   the data structure is a first data structure;
   the minimum cost maximum flow is a first minimum cost maximum flow;
   the respective weight is a first respective weight;
   the method further comprises:
      detecting a change in a condition of the application service provider network;
      responsive to detecting the change in the condition of the application service provider network, storing a second data structure representing the directed graph and representing the change in the condition of the application service provider network;
      using the second data structure to compute a second minimum cost maximum flow of the application service provider network;
      based on the second minimum cost maximum flow, determining a second respective weight for the particular data center and the particular point-of-presence;
      receiving a third application-layer request message at the particular point-of-presence;

based on the second respective weight, selecting a data center other than the particular data center to which to route the third application-layer request message;

in response to the selecting the other data center, sending a fourth application-layer request message from the particular point-of-presence that is based on the third application-layer request message, wherein the fourth application-layer request message is received at the other data center.

3. The method of claim 2, wherein the detecting the change in the condition of the application service provider network is based on determining a network round-trip-time in the application service provider network between the particular point-of-presence and the particular data center.

4. The method of claim 2, wherein the detecting the change in the condition of the application service provider network is based on determining a number of application-layer request messages received at the particular point-of-presence during a period of time.

5. The method of claim 2, wherein:
the data structure is a first data structure;
the minimum cost maximum flow is a first minimum cost maximum flow;
the respective weight is a first respective weight;
the method further comprises:
detecting an expiration of a timer;
responsive to detecting the expiration of the timer, storing a second data structure representing the directed graph and representing the change in the condition of the application service provider network;
using the second data structure to compute a second minimum cost maximum flow of the application service provider network;
based on the second minimum cost maximum flow, determining a second respective weight for the particular data center and the particular point-of-presence;
receiving a third application-layer request message at the particular point-of-presence;
based on the second respective weight, selecting a data center other than the particular data center to which to route the third application-layer request message;
in response to the selecting the other data center, sending a fourth application-layer request message from the particular point-of-presence that is based on the third application-layer request message, wherein the fourth application-layer request message is received at the other data center.

6. The method of claim 5, wherein the timer is configured to expire every five minutes.

7. The method of claim 1, wherein the first application-layer request message is a first hypertext transfer protocol (HTTP) request message.

8. The method of claim 1, wherein the first application-layer request message is a first secure hypertext transfer protocol (HTTPS) request message.

9. The method of claim 1, wherein:
the directed graph includes a source node representing sources of incoming application-layer request messages to the application service provider network;
the directed graph includes, for each point-of-presence of the plurality of points-of-presence, a respective directed edge from the source node to the node, of the first plurality of nodes, representing the point-of-presence;
the data structure includes, for each point-of-presence of the plurality of points-of-presence, a capacity value associated with the respective directed edge from the source node to the node, of the first plurality of nodes, representing the point-of-presence;
the method further comprises determining a flow demand based on a sum of the capacity values associated with the directed edges from the source node to the first plurality of nodes; and
the minimum cost maximum flow computation is based on the flow demand.

10. The method of claim 9, wherein, for each point-of-presence of the plurality of points-of-presence, the capacity value associated with the respective directed edge from the source node to the node, of the first plurality of nodes, representing the point-of-presence is in terms of a number of application-layer network messages per a fixed period of time for the point-of-presence.

11. The method of claim 10, wherein, for each point-of-presence of the plurality of points-of-presence, the number of application-layer network messages per a fixed period of time for the point-of-presence is determined based on application-layer request logs reflecting actual application-layer network messages received and processed by the point-of-presence during a period of time.

12. The method of claim 1, wherein:
the directed graph includes, for each point-of-presence of the plurality of points-of-presence, one or more respective directed edges, each respective directed edge of the one or more respective directed edges being from (a) the node, of the first plurality of nodes, representing the point-of-presence, to (b) a respective node, of the second plurality of nodes, representing a respective data center, of the plurality of data centers, that is reachable at an application network layer in the application service provider network from the point-of-presence;
the data structure includes, for each point-of-presence of the plurality of points-of-presence, for each respective directed edge of the one or more respective directed edges for the point-of-presence, a cost value associated with the respective directed edge representing a cost of sending application-layer network messages in the application service provider network from the point-of-presence to the data center; and
the minimum cost maximum flow is determined based on the cost values associated with the respective directed edges for the plurality of points-of-presence.

13. The method of claim 12, wherein the cost of sending application-layer network messages in the application service provider network from a point-of-presence to a data center is based on a round-trip-time for network messages between the point-of-presence and the data center.

14. The method of claim 1, wherein, as a result of computing the minimum cost maximum flow of the application service provider network, a particular directed edge of the directed graph is associated with a particular edge flow value; wherein the respective weight for the particular data center and the particular point-of-presence is determined based on the particular edge flow value; and wherein the particular directed edge is from a node, of the first plurality of nodes, representing the particular point-of-presence to a node, of the second plurality of nodes, representing the particular data center.

15. One or more non-transitory computer-readable media storing one or more programs for execution by a computing system having one or more processors, the one or more programs including instructions which, when executed by the computing system, cause the computing system to perform:
  storing a data structure representing a directed graph, the directed graph representing an application service provider network, the directed graph having nodes and directed edges, the nodes including a first plurality of nodes representing a plurality of edge devices in the application service provider network and including a second plurality of nodes representing a plurality of destination devices in the application service provider network;
  using the data structure to compute a minimum cost maximum flow of the application service provider network;
  based on the minimum cost maximum flow, determining a respective weight for a particular destination device, of the plurality of destination devices, that is reachable at an application network layer from a particular edge device, of the plurality of edge devices;
  receiving a first application-layer request message at the particular edge device;
  based on the respective weight, selecting the particular destination device to which to route the first application-layer request message; and
  in response to the selecting the particular destination device, sending a second application-layer request message that is based on the first application-layer request message from the particular edge device, wherein the second application-layer request message is received at the particular destination device.

16. The one or more non-transitory computer-readable media of claim 15, wherein:
  the data structure is a first data structure;
  the minimum cost maximum flow is a first minimum cost maximum flow;
  the respective weight is a first respective weight;
  the instructions, when executed by the computing system, cause the computing system to perform:
    detecting a change in a condition of the application service provider network;
    responsive to detecting the change in the condition of the application service provider network, storing a second data structure representing the directed graph and representing the change in the condition of the application service provider network;
    using the second data structure to compute a second minimum cost maximum flow of the application service provider network;
    based on the second minimum cost maximum flow, determining a second respective weight for the particular destination device and the particular edge device;
    receiving a third application-layer request message at the particular edge device;
    based on the second respective weight, selecting a destination device other than the particular destination device to which to route the third application-layer request message;
    in response to the selecting the other destination device, sending a fourth application-layer request message from the particular edge device that is based on the third application-layer request message, wherein the fourth application-layer request message is received at the other destination device.

17. The one or more non-transitory computer-readable media of claim 16, wherein the detecting the change in the condition of the application service provider network is based on determining a network round-trip-time in the application service provider network between the particular edge device and the particular destination device.

18. The one or more non-transitory computer-readable media of claim 16, wherein the detecting the change in the condition of the application service provider network is based on determining a number of application-layer request messages received at the particular edge device during a period of time.

19. The one or more non-transitory computer-readable media of claim 16, wherein:
  the data structure is a first data structure;
  the minimum cost maximum flow is a first minimum cost maximum flow;
  the respective weight is a first respective weight;
  the instructions, when executed by the computing system, cause the computing system to perform:
    detecting an expiration of a timer;
    responsive to detecting the expiration of the timer, storing a second data structure representing the directed graph and representing the change in the condition of the application service provider network;
    using the second data structure to compute a second minimum cost maximum flow of the application service provider network;
    based on the second minimum cost maximum flow, determining a second respective weight for the particular destination device and the particular edge device;
    receiving a third application-layer request message at the particular edge device;
    based on the second respective weight, selecting a destination device other than the particular destination device to which to route the third application-layer request message;
    in response to the selecting the other destination device, sending a fourth application-layer request message from the particular edge device that is based on the third application-layer request message, wherein the fourth application-layer request message is received at the other destination device.

20. A computing system, comprising:
  one or more processors;
  storage media;
  one or more programs stored in the storage media, the one or more programs having instructions which, when executed by the computing system, cause the computing system to perform:
  storing a data structure representing a directed graph, the directed graph representing an application service provider network, the directed graph having nodes and directed edges, the nodes including a first plurality of nodes representing a plurality of points-of-presence in the application service provider network and including a second plurality of nodes representing a plurality of data centers in the application service provider network;
  using the data structure to compute a minimum cost maximum flow of the application service provider network;
  based on the minimum cost maximum flow, determining, for each point-of-presence of the plurality of points-of-presence, a respective weight for each data center, of the plurality of data centers, that is reachable from the point-of-presence as represented according to the data structure by a particular directed edge from a particular node representing the point-of-presence to a particular node representing the data center;

receiving a first application-layer request message at a first point-of-presence of the plurality of points-of-presence;

selecting a target data center of the plurality of data centers based on the respective weight determined for first point-of-presence and the target data center; and in response to the selecting the target data center, sending a second application-layer request message that is based on the first application-layer request message from the first point-of-presence to the target data center.

* * * * *